(12) United States Patent
Mizuno

(10) Patent No.: US 8,072,636 B2
(45) Date of Patent: Dec. 6, 2011

(54) INFORMATION PROCESSING APPARATUS, INFORMATION PROCESSING METHOD, AND PRINT CONTROL SYSTEM

(75) Inventor: Atsushi Mizuno, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 1139 days.

(21) Appl. No.: 11/843,626

(22) Filed: Aug. 22, 2007

(65) Prior Publication Data

US 2008/0130026 A1    Jun. 5, 2008

(30) Foreign Application Priority Data

Dec. 4, 2006    (JP) ................. 2006-327028

(51) Int. Cl.
- G06F 3/12 (2006.01)
- G06F 15/16 (2006.01)
- G06F 15/173 (2006.01)
- G06F 13/38 (2006.01)
- H04N 1/60 (2006.01)

(52) U.S. Cl. ........ 358/1.15; 358/1.1; 358/1.13; 358/1.9; 709/200; 709/225; 710/62

(58) Field of Classification Search .............. 358/1.15, 358/1.1, 1.13, 1.9; 709/225, 226, 227, 229, 709/200; 710/62

See application file for complete search history.

(56) References Cited

U.S. PATENT DOCUMENTS

| | | | |
|---|---|---|---|
| 6,202,092 B1 * | 3/2001 | Takimoto | 709/225 |
| 2004/0141203 A1 * | 7/2004 | Honma | 358/1.15 |
| 2004/0199399 A1 * | 10/2004 | Sugiyama | 705/1 |
| 2006/0187486 A1 | 8/2006 | Tsuchitoi | |

FOREIGN PATENT DOCUMENTS

| | | |
|---|---|---|
| JP | 11-134136 | 5/1999 |
| JP | 2004-007477 | 1/2004 |
| JP | 2004-348630 | 12/2004 |
| JP | 2006-268837 | 10/2006 |

* cited by examiner

*Primary Examiner* — King Poon
*Assistant Examiner* — Neil R McLean
(74) *Attorney, Agent, or Firm* — Fitzpatrick, Cella, Harper & Scinto

(57) ABSTRACT

An information processing apparatus which performs a process on the basis of an access control information, or ACT, for control of a use of a function of a peripheral device for each user acquires setting information about the use of the function of the peripheral device specified by the user, and the ACT corresponding to the user. If the user-specified setting information is permitted by the ACT and if the setting information permitted by the ACT is not set by the user-specified setting information, the apparatus displays a screen indicating that the user-specified setting information can be changed according to the ACT.

11 Claims, 11 Drawing Sheets

FIG. 4

```
<?xml version="1.0" encoding="UTF-8"?>
<ACT xmlns:xsi="http://www.w3.org/2001/XMLSchema-instance">
  <Version>0</Version>
  <UserInfo>
    <UserName>mizuno</UserName>                  ⎫
    <BaseRole> PowerUser </BaseRole>             ⎬ 401
    <UserEmail> mizuno@xxx.yyy </UserEmail>      ⎭
  </UserInfo>
  <DeviceInfo>
    <PrintSecurityLevel> 0 </PrintSecurityLevel>
  </DeviceInfo>
  <DeviceAccessControl>                                                          ⎫
    <AttributeCategory Name="DeviceCapabilityRestriction" CategoryStatus ="Static">
      <saml:AttributeStatement>
        <saml:Attribute Name="PdlPrint">
          <saml:AttributeValue Name="PdlPrintFlag" ConfigMode="Restriction">
              Permit
          </saml:AttributeValue>
          <saml:AttributeValue Name="ColorPrint" ConfigMode="Restriction">      ⎬ 402
              Deny
          </saml:AttributeValue>
          <saml:AttributeValue Name="Staple" ConfigMode="Useful">
              Permit
          </saml:AttributeValue>
        </saml:Attribute>
      </saml:AttributeStatement>
    </AttributeCategory>
  </DeviceAccessControl>                                                         ⎭
</ACT>
```

FIG. 6

| APPLIED MODE | FUNCTION RESTRICTION | FUNCTION UTILIZATION | FUNCTION RESTRICTION | FUNCTION RESTRICTION | FUNCTION RESTRICTION | FUNCTION RESTRICTION | FUNCTION UTILIZATION |
|---|---|---|---|---|---|---|---|
| | | | | | PRINT | | |
| FUNCTION | COPY | SEND | FACSIMILE | TWO-SIDED/ ONE-SIDED | Nup | COLOR | STAPLE |
| USER A | YES | YES | YES | ONE-SIDED AVAILABLE | 1 | YES | YES |
| USER B | YES | YES | YES | ONE-SIDED AVAILABLE | 1 | YES | YES |
| USER C | YES | YES | NO | ONE-SIDED AVAILABLE | 2 | NO | NO |
| USER D | YES | NO | NO | TWO-SIDED ONLY | 2 | NO | YES |
| ... | | | | | | | |
| ... | | | | | | | |

INFORMATION PROCESSING APPARATUS, INFORMATION PROCESSING METHOD, AND PRINT CONTROL SYSTEM

BACKGROUND OF THE INVENTION

1. Field of the Invention

The present invention relates to an information processing apparatus, an information processing method, and a print control system for performing flexible control of the functions that can be executed by a user using a peripheral device (printing apparatus) such as a copying machine, a printer, etc.

2. Description of the Related Art

Recently, a computer network (hereinafter referred to simply as a network) such as the Internet etc. in which computers are interconnected are widely used. These networks are built on the floor of a building, in an entire building, among buildings (LAN), in an area, or in a large area on a worldwide scale.

In addition to a computer, a computer peripheral device (printing apparatus) such as a printer, a facsimile, a copying machine, etc. can be connected to a network in many cases, and can be used over the network. In a printing operation through a network (network printing), the printing operation can be performed from a remote location, which enables a large and high-speed printer and an expensive color printer to be shared among a plurality of computers, and the printing through a network has been commonly used.

Furthermore, the recent printing apparatus such as a copying machine etc. is not limited to an apparatus having the function of copying an original, but has the functions of printing a print job from an external client, a function of electronically transmitting a scanned original to an external device using e-mail and file transfer functions. The copying machine is called an MFP (multifunction peripheral).

On the other hand, there occurs a managemental problem of increasing the risk of a leakage of information by transmitting MFP-scanned information to an external device. There is a request as a conventional subject to restrict the printing function for each user and the possible number of printed copies because the number of consumed sheets and the cost of toner rise with an increasing number of printed copies. The problem is serious from the viewpoint of reducing the TCO (total cost of ownership).

With respect to these problems, several solving methods have already been proposed. For example, the Japanese Patent Application Laid-Open No. H11-134136 proposes a method of managing each user by an ID and restricting the available functions, resources, and time of a copying machine and a printer for each ID.

Furthermore, while there are functions to be use-restricted among the functions of the above-mentioned multifunction peripheral device (MFP), there are many cases in which common users other than a system manager do not know what functions the MFP has. That is, although a system producer introduces a high-function MFP, the functions are not fully utilized, or it is not certain whether or not the functions are needed.

Relating to the problems, some solving means are proposed. For example, the Japanese Patent Application Laid-Open No. 2004-007477 discloses the technique of detecting the function of a peripheral device of a user, the use frequency of an option, etc. and offering a proposition such as changing an output device for each color or monochrome, etc. to a user from a service center.

In a system of a conventional technique, a system manager generally sets restriction information for each user relating to the function restrictions, manages and operates the information by holding data in table form in the system. In addition, it is assumed that a function, a capability, and an option as required can be identified by referring to a set value of a print job.

However, a system manager may intend to place use restrictions or may intend to promote a use relating to the functions of a currently available MFP. For example, the system manager may request to use a staple with the dedicated sheets shared among specific departments and divisions and the convenience taken into account.

SUMMARY OF THE INVENTION

The present invention aims at providing, in a system capable of controlling the authorization of the use of a function and a service of a peripheral device corresponding to a user, a print control method capable of flexibly applying to a user both use restrictions and use promotions of functions and services provided for a peripheral device.

To solve the above-mentioned subject, the information processing apparatus for performing the process on the basis of the access control information for control of a use of a function of a peripheral device for each user according to the present invention includes: a first acquisition unit adapted to acquire setting information relating to a use of the function of the peripheral device specified by a user; a second acquisition unit adapted to acquire access control information corresponding to the user; and a display control unit adapted to display a display screen informing that setting information acquired by the first acquisition unit can be changed on a basis of the access control information acquired by the second acquisition unit can be changed when the setting information acquired by the first acquisition unit is permitted by the access control information acquired by the second acquisition unit, and the setting information permitted by the access control information acquired by the second acquisition unit is not set by the setting information acquired by the first acquisition unit.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 4 illustrates an example of the contents of an ACT 105 in the first mode for embodying the present invention.

FIG. 6 illustrates an example of the status in which the access control information (ACL) stored in an ACL database 107 is held in a table in the first mode for embodying the present invention.

DESCRIPTION OF THE EMBODIMENTS

Preferred embodiments of the present invention will now be described in detail in accordance with the accompanying drawings.

First Mode for Embodying the Present Invention

A mode for embodying the present invention is described below with reference to the attached drawings.

Figure 1:
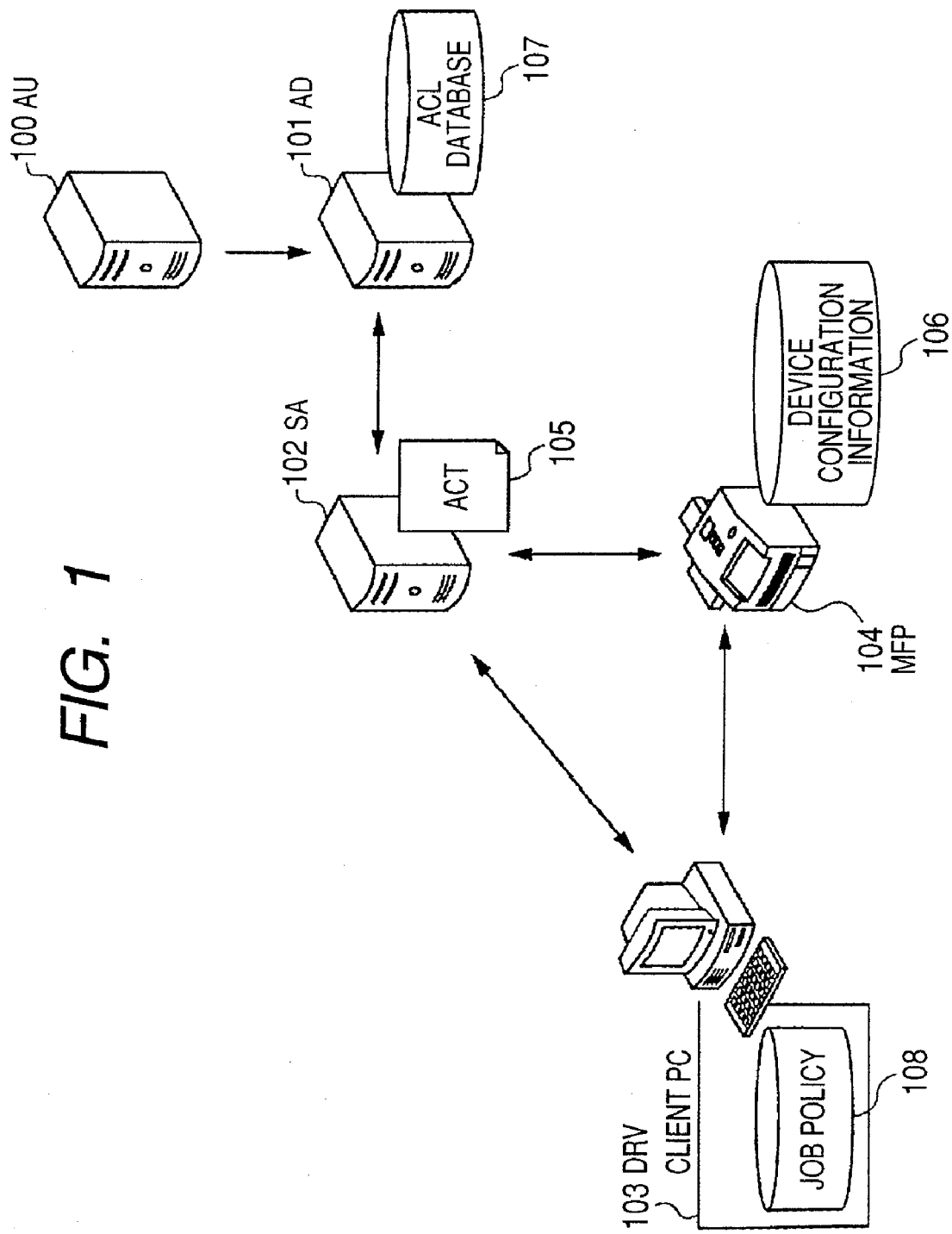
FIG. 1 illustrates the entire configuration of the system according to the first mode for embodying the present invention.

FIG. 1 shows the entire configuration of the system according to the present invention. FIG. 1 is described in the notation of an UML (universal modeling language).

The system according to the mode for embodying the present invention is a system configured by a peripheral device, server PC, and a client PC connected over a network. The system is a print management system for placing access restrictions of a user using a peripheral device, and job execution restrictions such as the number of printed copies etc. The user includes a personal user, a division, an organization, etc.

A system manager utility (hereinafter referred to as an AU) 100 is supposed to operate on a server PC, and sets and manages the present system. Especially, the AU 100 can set the access control information about a user information server 101.

A user information such as a user ID, a password, etc. and access control information (ACL) about which function is use-permitted for each user and each peripheral device in the system are managed in the user information server (hereinafter referred to as an AD) 101. The AD 101 is realized using, for example, an LDAP (lightweight directory access protocol) server, an active directory server, etc. In the present mode for embodying the present invention, the access control information is associated with user information and held in an ACL database 107 in the AD 101. The ACL database 107 can be connected as an external database server to the AD 101 through network. The access control information is described later.

A ticket issue server (hereinafter referred to as an SA) 102 issues a ticket describing the information about an available function on the basis of the ACL stored in the AD 101. The ticket is called an access control token (hereinafter referred to as an ACT). The ACT describes the access control information about an available peripheral device etc. on a system for a user.

A printer driver (hereinafter referred to as a Drv) 103 operates on a client PC, and issues a print job described in a page description language (PDL). When a client PC is used, it is supposed that a user login process is performed to designate a user that is using the client PC. Although the process of designating a user is not performed, it is also possible that a process described later is exceptionally performed by assigning, to a guest user etc., access control information different from the information for a common user. Furthermore, the Drv 103 includes a job policy 108 that regulates the rules of a print job set value, and appropriately changes the print job set value on the basis of the job policy 108. The job policy 108 is described later in detail.

A multifunction copying machine (hereinafter referred to as an MFP) 104 functions as a peripheral device. The MFP 104 has the function of copying a paper original and printing print data transmitted from an external printer driver. The MFP 104 also has the function of reading a paper original and transmitting the image data in the paper original to an external file server or a mail address (SEND function, remote scan function). Furthermore, the MFP 104 is assumed to have the function of reading data to another MFP, transmitting the data, and printing the data on the destination MFP (remote copy function).

An access control token (hereinafter referred to as an ACT) 105 is issued by the SA 102. The ACT 105 is information describing access control information in a peripheral device such as the MFP 104 etc. of a user for control of an executable (or restricted) function and service. The ACT 105 is issued by the SA 102, and transmitted to a client PC and the MFP 104 over a network. A print request from a user is executed by each peripheral device according to the ACT 105.

A device configuration information 106 is information about the configuration of a device of a peripheral device. It is also information about the function and capability, such as an option information of the MFP 106 etc., of a peripheral device. The device configuration information 106 can be managed by an MFP or shared between a client PC and the MFP 104.

Figure 2:
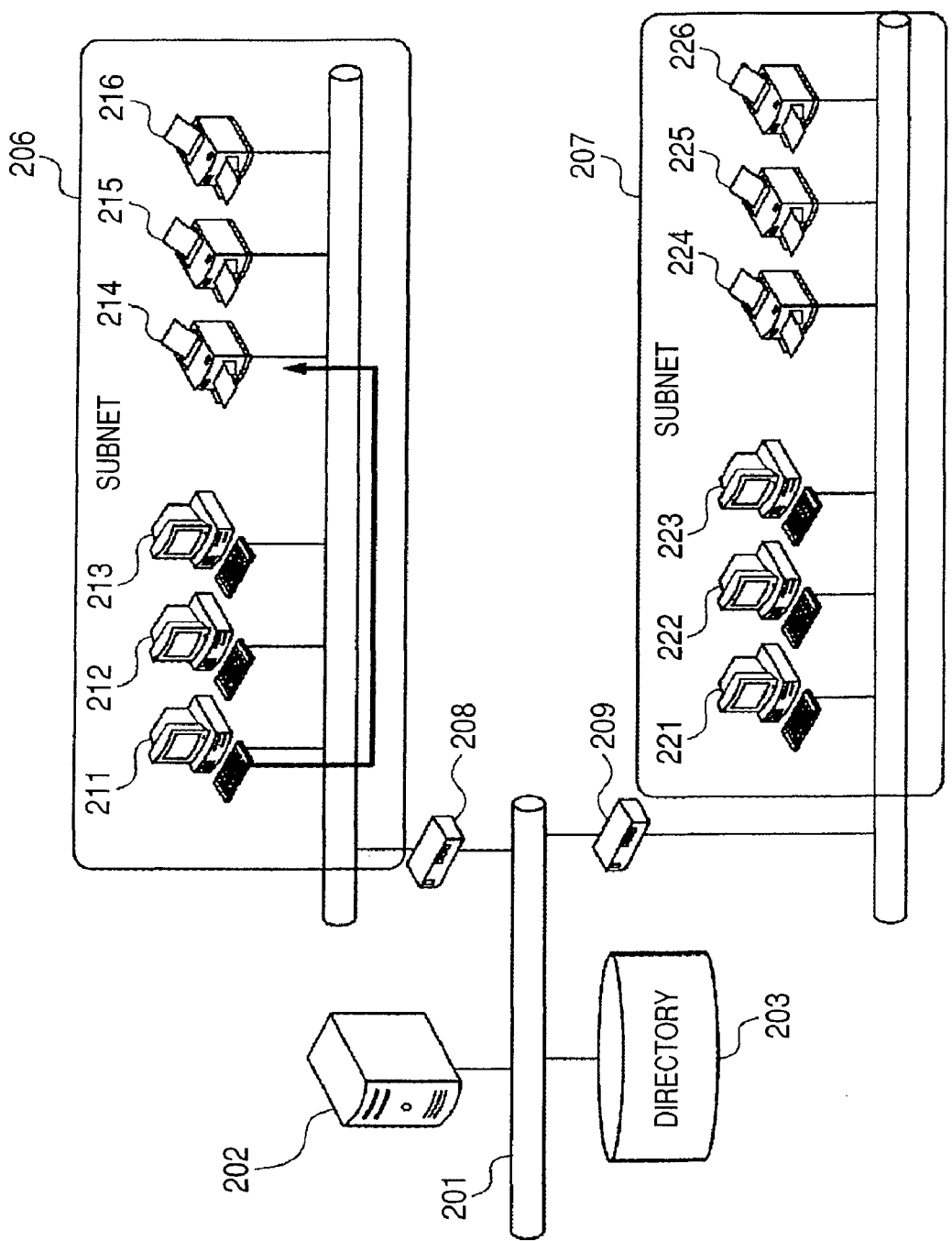
FIG. 2 is a view illustrating an example of the arrangement of each function element in the system described with reference to FIG. 1.

FIG. 2 is a view showing an example of the arrangement of each function element in the system shown in FIG. 1.

Each terminal according to the mode for embodying the present invention is connected a network 201. Generally, the network 201 provides a service to a local user group such as a user group etc. on a specific floor or a plurality of sequential floors in a building by a connection of the Ethernet (registered trademark) etc. For example, a wide area network (WAN) can be generated as a user moves farther away from another user, for example, in a case where a user is located in another building or in a remote place etc. A WAN is basically a set formed by connecting some LANs through a high-speed digital line such as a global area Ethernet (registered trademark), an ISDN telephone circuit, etc. These connections are simple electric connections via several buses.

In the present mode for embodying the present invention, it is assumed that the network 201 is configured by the Ethernet (registered trademark).

A server PC 202 is connected to the network 201. The AU 100 and the SA 102 operate on the server PC 202. The server PC 202 is configured by a computer corresponding to the OS such as Microsoft Windows (registered trademark) etc. and an application program etc. for execution of the OS and the management function.

The AD 101 operates on a directory server 203. Therefore, access control information (ACL) and user information are held in the directory server 203.

Subnets 206 and 207 are located in the network 201.

Routers 208 and 209 control a packet of a network for configuration of a subnet.

The Drv 103 operates on client PCs 211 to 213 and 221 to 223.

Copying machines 214 to 216 and 224 to 226 correspond to the MFP 104.

The SAs and Drvs other than the MFP 104 can be all realized by client computers, or can be realized by being distributed to a plurality of server computers. That is, an interface between the Drv 103 and the SA 102, and an interface between the SA 102 and the AD 101 can be a physical communication medium such as a network, a local interface, a CPU bus, etc. Otherwise, the interface can be configured by a logical interface for message communications configured as software. Furthermore, each of the above-mentioned function blocks can be executed by the CPU executing a program, and can be implemented by a circuit of hardware.

Figure 3:
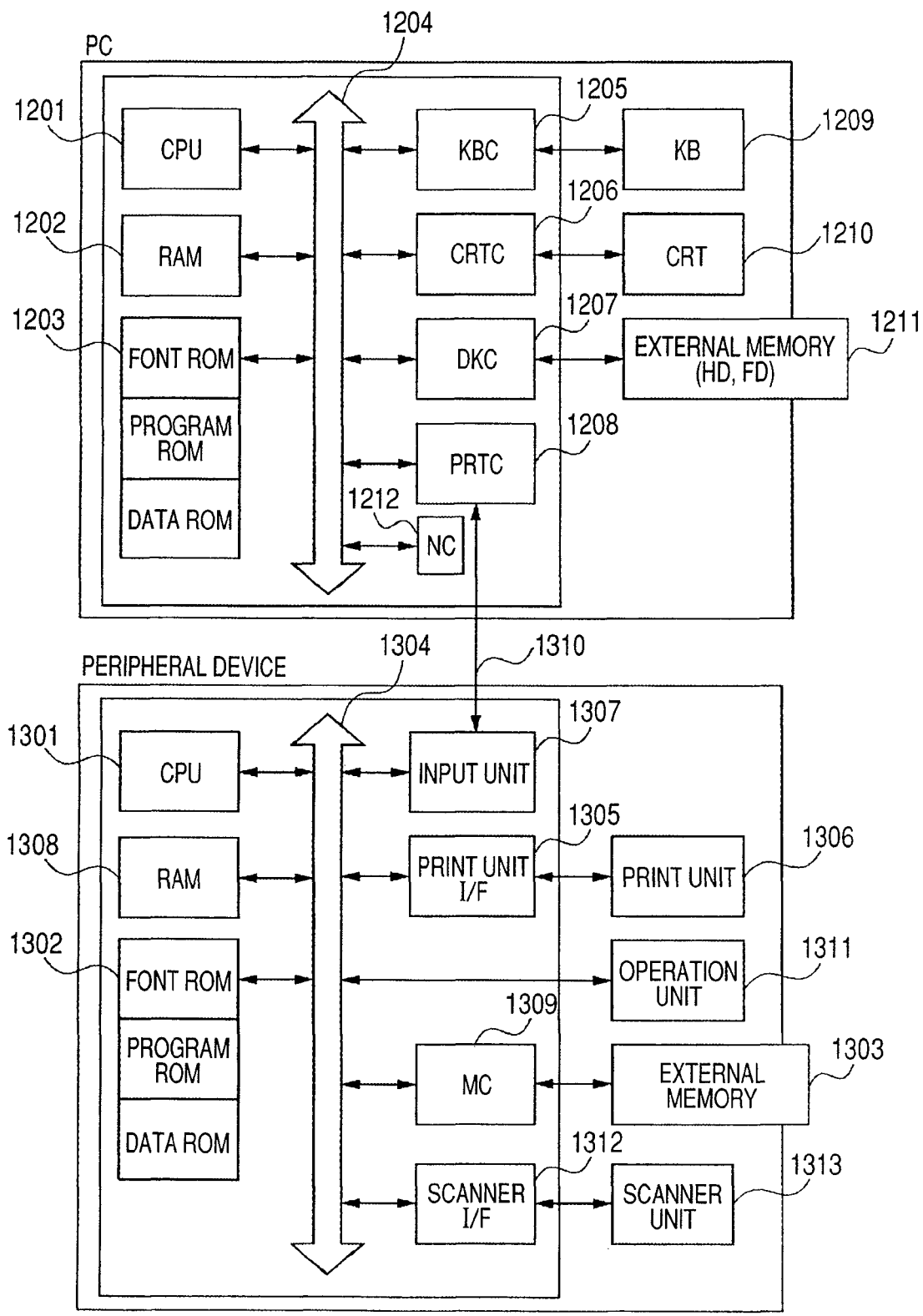
FIG. 3 illustrates the configuration of the hardware of a server PC 202, a PC such as a client PC etc., and a peripheral device such as an MFP 104 etc. applicable to the present invention.

FIG. 3 shows the connection of a PC such as the server PC 202, the client PC, etc. and a peripheral device such as the MFP 104 etc. for communication over a network etc.

First, the configuration of the PC is described below. It is assumed that the hardware block diagram shown in FIG. 3 corresponds to a hardware block diagram of a common information processing apparatus, and the hardware configuration of a common information processing apparatus can be applied to a PC of the mode for embodying the present invention.

In FIG. 3, a CPU 1201 executes a program of an OS, an application, etc. stored in program ROM of ROM 1203 or loaded into RAM 1202 from a hard disk 1211. The OS is short for an operating system operating on a computer, and the operating system is hereinafter referred to as an OS. The process of each flowchart described later can be realized by the execution of the program. The RAM 1202 functions as main memory of the CPU 1201, a work area, etc. A keyboard controller (KBC) 1205 controls key input from a keyboard 1209 and a pointing device not shown in the attached drawings. A CRT controller (CRTC) 1206 controls the display of a CRT display 1210. A disk controller (DKC) 1207 controls data access of a hard disk (HD) 1211 for storing various data, a floppy (registered trademark) disk (FD), etc. A PRTC 1208 controls the exchange of signals with a connected peripheral device. An NIC 1212 is connected to a network, and performs a communication controlling process with other equipment connected to the network.

Described next is the configuration of a peripheral device. As shown in FIG. 3, in the peripheral device, a CPU 1301 of the peripheral device controls each block connected to a system bus 1304 on the basis of the control program stored in ROM 1302 and external memory 1303. An image signal generated in the process of the CPU 1301 is output as output information to a print unit (image generation apparatus engine) 1306 through a print unit I/F 1305. The CPU 1301 communicate with a host PC through an input unit 1307, and can notify the host PC of the information etc. about the peripheral device.

The program ROM in the ROM 1302 stores a control program etc. of the CPU 1301. The ROM for a font in the ROM 1302 stores font data etc. for use in generating output information. In the ROM for data in the ROM 1302, information etc. for use on the host PC is stored.

RAM 1308 functions as main memory of the CPU 1301, a work area, etc., and is configured such that a memory capacity can be expanded by optional RAM connected to an expanded port not shown in the attached drawings. The RAM 1308 is used as an output information expanding area, an environment data storage area, an NVRAM, etc.

The external memory 1303 is access controlled by a memory controller (MC) 1309. The external memory 1303 is connected as an option, and stores font data, emulation program, form data, etc. Furthermore, an operation panel 1311 is configured by a switch, an LED display, etc. for operation.

A scanner I/F 1312 performs correcting, processing, and editing operations on the image data received from a scanner unit 1313. The scanner unit 1313 converts the information about an image into an electric signal by inputting reflected light obtained by exposing and scanning an image on an original. Furthermore, the electric signal is converted into a brightness signal of each of the colors R, G, and B, and reads the brightness signal as image data. When a user issues a read start instruction from the operation unit 1311, an original read instruction is transmitted to the scanner unit 1313. Upon receipt of the instruction, a scanner unit 1112 performs an original reading operation. The original reading method can be an automatic feed system in which an original is set on an original feeder (not shown in the attached drawings) Furthermore, an original can be scanned by placing the original on a glass plate and moving an exposing unit.

Described below is the outline of the entire operation of the system shown in FIG. 1.

An example of the sequence of the operation of each of the practical devices is described below.

The AU 100 sets the access control information about each user on the AD 101, and the AD 101 stores the access control information (ACL).

The MFP 104 requests the SA 102 to issue an ACT describing the access control information about the MFP 104 during power-up or reset.

The SA 102 obtains access control information relating to the MFP 104 stored in the ACL database 107 of the AD 101. Then, the SA 102 issues the ACT 105 including the obtained access control information, adds an electronic signature for certification of the issue by the SA 102, and returns the ACT 105 to the MFP 104.

The MFP 104 initializes the inside of the MFP on the basis of the contents of the access control information described in the obtained ACT 105. For example, the a default setting process is performed on the initial screen of the MFP.

Before issuing a print job to the MFP 104, the Drv 103 requests the SA 102 to issue an ACT about a user who is to issue a job.

The SA 102 acquires access control information corresponding to a user whose ACT is requested and issued from the ACL database 107 of the AD 101. Then, the SA 102 generates the ACT 105 reflecting the settings to be permitted for the user, places an electronic signature for certification of the issue of the SA 102, and returns the ACT 105 to the Drv 103.

The Drv 103 requests the MFP 104 to issue the device configuration information 106. The MFP 104 refers to the capability of equipment, generates the device configuration information 106, and returns the information to the Drv 103.

The Drv 103 refers to the job policy 108, determines a set value of a job, adds the ACT 105 as the header of the job, and transmits the job to the MFP 104.

Upon receipt of the job, the MFP 104 compares the access control information described in the ACT acquired during power-up, the access control information described in the ACT 105 in the job, and the request contents to be actually executed in the job. At this time, if the requested contents are included in available functions, the request is performed. Otherwise, the job is canceled, or the job of the user is performed in the function permitted according to the access control information described in the ACT. Practically, when the user who is permitted to perform monochrome printing only in the ACL is performing a color printing job, the user is forced to perform monochrome printing.

In the present mode for embodying the present invention, the MFP 104 acquires an ACT during power-up etc., but the ACT can be acquired each time a job is executed, or the job of a user can be controlled using only the ACT 105 in the job.

FIG. 4 shows an example of the contents of the ACT 105.

A portion 401 shows the information about a user who has acquired the ACT. In this example, the user is mizuno, and is assigned a role of PowerUser. Furthermore, the mail address is mizuno@xxx.yyy. In addition, when the MFP 104 requests an issue of an ACT during power-up etc., it is not necessary to include the portion 401.

A portion 402 describes the attribute information about a function, the application mode corresponding to the attribute information, and the authorization of a user who has acquired an ACT with respect to the function in the MFP 104. The application mode of a function can be a "function restriction mode" and a "function utilization mode", and the details are described later. In this example, the application mode and the authorization for the attribute information about each function is set as follows.

PDL print (a type of printing function from a PC): function restriction mode, and the user (mizuno) is permitted to use.

color print: function restriction mode, and the user (mizuno) is not permitted to use.

staple: function utilization mode, and the user (mizuno) is permitted to use.

Figure 5:
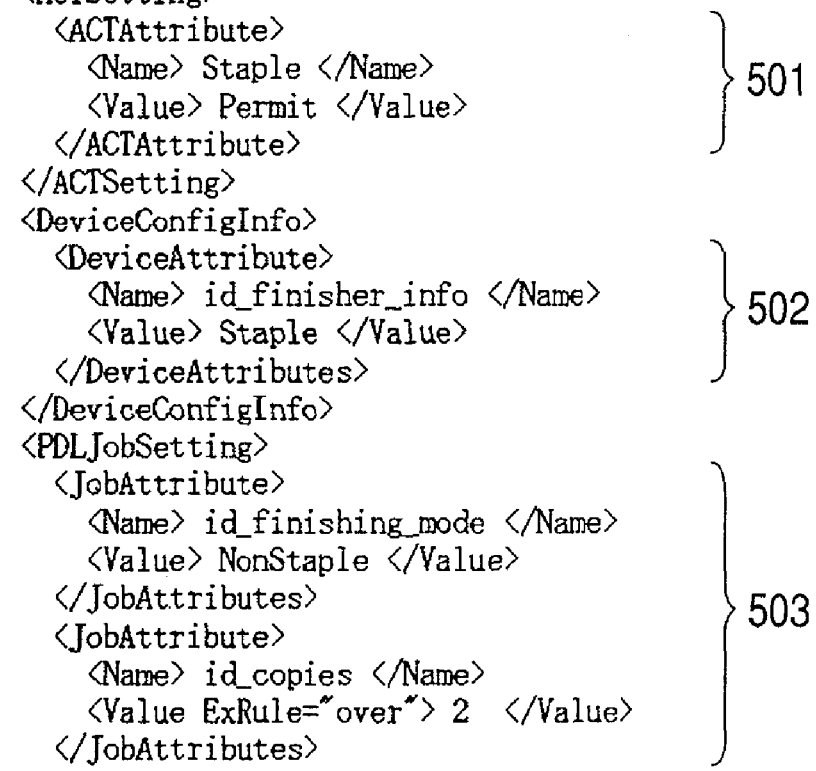
FIG. 5 illustrates an example of the contents of a job policy 108 in the first mode for embodying the present invention.

FIG. 5 shows an example of the contents of the job policy 108. In this example, a staple is described as the attribute information about a function. In addition, the conditions relating to an ACT, device configuration information, and job setting are defined respectively. Each condition is used when it is determined whether or not a user is allowed to utilize more effectively a function of a peripheral device in the function utilizing process described below with reference to FIG. 9.

A condition 501 relates to an ACT. In this example, the conditions are the attribute name of "Staple" in the ACT, and the value of "Permit".

A condition 502 relates to device configuration information. In this example, the conditions are the attribute name of "id_finishing_info" in the device configuration information, and the value of "Staple".

A condition 503 relates to a job setting. There are two conditions in this example. One is that the value of an attribute name of "id_finishing_mode" is "NonStaple". The other is that the value of an attribute name of "id_copies" is "2" or more.

The job policy 108 is included by the Drv 103, but a manager user can set the policy.

FIG. 6 shows an example of the status in which the access control information (ACL) stored in an ACL database 107 is held in a table.

In the access control information, with respect to each function of the MFP 104, an application mode of a function and control information about the attribute or permission/prohibition, etc. of a use of a function for each user are set.

In this example, in addition of the functions of copying, SEND, facsimile, and printing, a function application mode and a use for each user can be set with respect to the print setting during a printing process. Relating to the function performed by setting a use, any function provided by an MFP such as a BOX function etc. can be applied.

As described above, the access control information is set in advance by a manager user using the AU 100.

Figure 7:
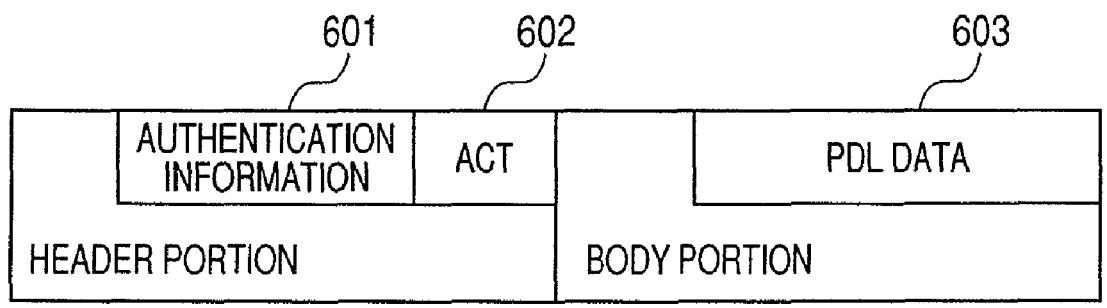
FIG. 7 illustrates an example of a job issued at an instruction of a user in the first mode for embodying the present invention according to the present invention.

FIG. 7 shows an example of a job issued at an instruction of a user.

A job is configured by a header portion and a body portion. The header portion includes an authentication information portion 601 indicating who is a user that has issued a job (user ID etc.), and an ACT portion 602 storing (describing) the ACT 105 etc. The body portion is configured by a PDL data portion 603 etc. which displays the contents of work to be requested to the copying machine. In this example, printing data included in the body portion is requested. The ACT portion 602 stores (describes) the ACT 105 received by the Drv 103 from the SA 102.

Described above is the system configuration and the outline of the operation of the system according to the mode for embodying the present invention.

The detailed process performed by each device according to the present mode for embodying the present invention is described below with reference to FIGS. 8 and 9.

Figure 8:
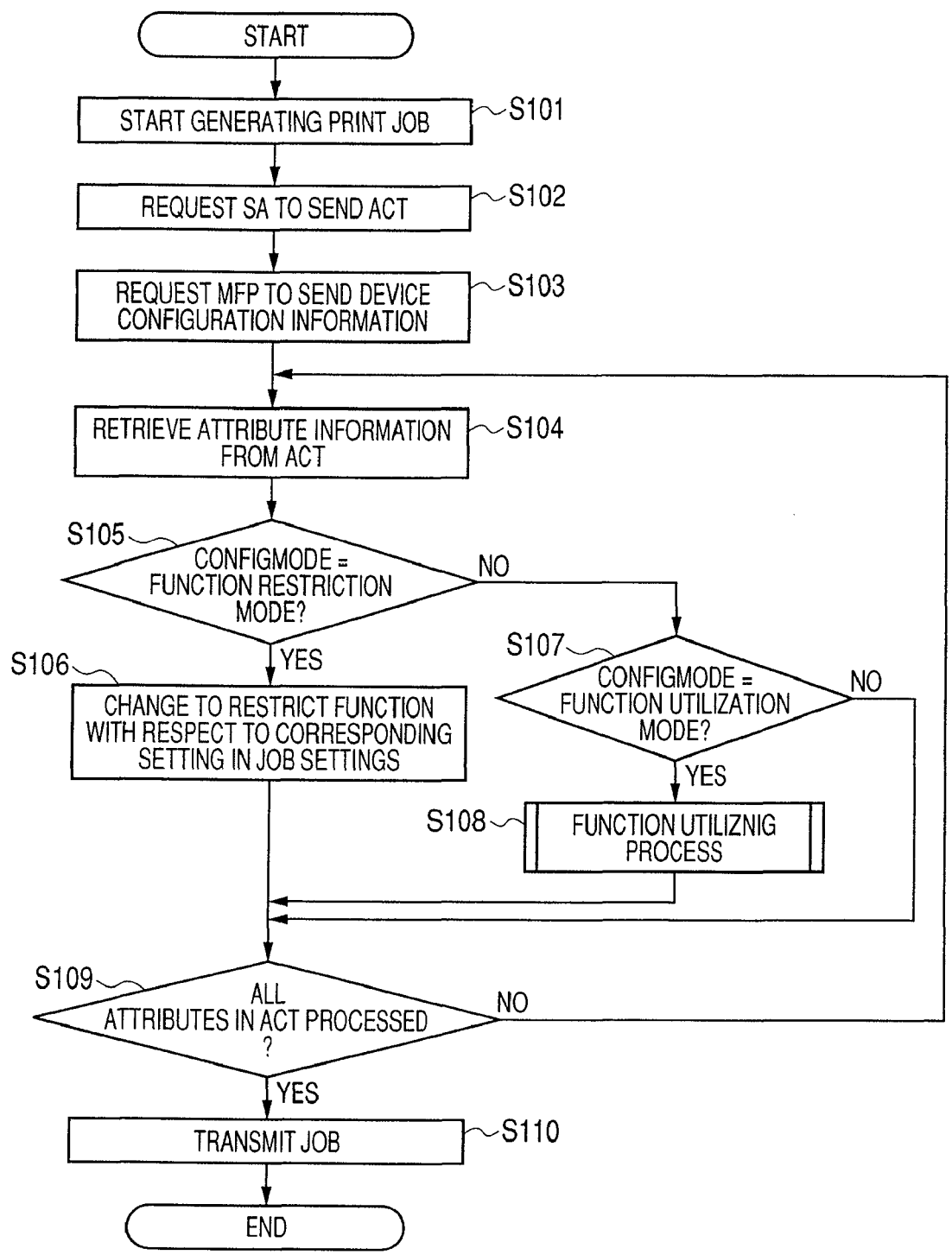
FIG. 8 is a flowchart on the basis of a control program relating to the process performed when the Drv 103 issues a print job to an MFP 104 in the first mode for embodying the present invention.

FIG. 8 is a flowchart on the basis of a control program relating to the process performed when the Drv 103 issues a print job to the MFP 104. The control program is stored in the ROM or RAM of a client PC, an HD, etc., and executed by the CPU 1201 (or the Drv 103), thereby realizing the process described in the control program.

In FIG. 2, as a presumption, it is assumed that the Drv 103 operates on the client PC 211, and the copying machine 214 is the MFP 104.

In S101, a user instructs the Drv 103 through an application to start printing, and the generation of a print job is started.

In S102, The Drv 103 requests the SA 102 to send the ACT 105. By the request, the Drv 103 acquires the ACT 105 by receiving the ACT 105 issued and sent by the SA 102.

In S103, the Drv 103 acquires the device configuration information 106 from the MFP 104. The device configuration information 106 is the abstract of the data acquired using an SNMP (simple network management protocol) etc. The SNMP is a network protocol regulated by an IETF RFC 1157 etc. Using the protocol and structured data called an MIB, the information about a node over a network can be acquired.

In S104, the Drv 103 refers to the ACT 105 acquired in S102, and the attribute information about a function is retrieved piece by piece from the portion 402 of the ACT 105. For example, the information about a color print, a staple, etc. is retrieved as the attribute information about a function.

In S105, the application mode (ConfigMode) of the attribute information about a function is referred to. The Drv 103 determines whether or not a function restriction mode (Restriction) is set as an application mode. If the function restriction mode is set, control is passed to S106. Otherwise, control is passed to S107.

In S106, the Drv 103 changes the set value of a job without contradiction to the access control information (print authorization such as color etc.) regulated by the ACT 105. When the job setting is changed, the information that the user-specified print setting is not permitted according to the access control information is displayed on the display of the CRT display 1210 etc., thereby transmitting a notification to the user. Before changing the user-specified print setting, the information that the permission according to the access control information has not been acquired is displayed, a user permission is obtained, and then a setting change can be made in the implementation. At this time, the control of automatically changing a setting can be forcibly performed to re-instruct a user to newly set a printing operation. For example, in the case of the 402 portion of the ACT 105, color print is set as the "function restriction mode", and the authorization of the user refers to the prohibition of color print. Therefore, when the user specifies color print as a set value for a job, the job set value is changed to monochrome print. When the user specifies monochrome print, the monochrome print is maintained as is. In this example, the print setting is changed according to the ACT, but a user can receive a notification about disabled printing, and cancel the job.

In S107, the Drv 103 refers to the application mode (ConfigMode) of the attribute information about a function, and determines whether or not the function utilization mode (Useful) is set. When the function utilization mode is set, control is passed to S108. Otherwise, control is passed to step S109.

In S108, the function utilizing process is performed as a process to be performed when the application mode is set as a "function utilization mode". The details are described later with reference to FIG. 9.

In S109, the Drv 103 determines whether or not the attribute information about all functions in the 402 portion of the ACT 105 has completed the process in S104 to S108. When the process is completed, control is passed to S110. Otherwise, control is passed to step S104, and the process of the next attribute is continued.

In S110, the set value of a job after the completion of the above-mentioned processes is presented to the user through the CRT display 1210 etc., and the job is transmitted to the MFP 104.

Figure 9:
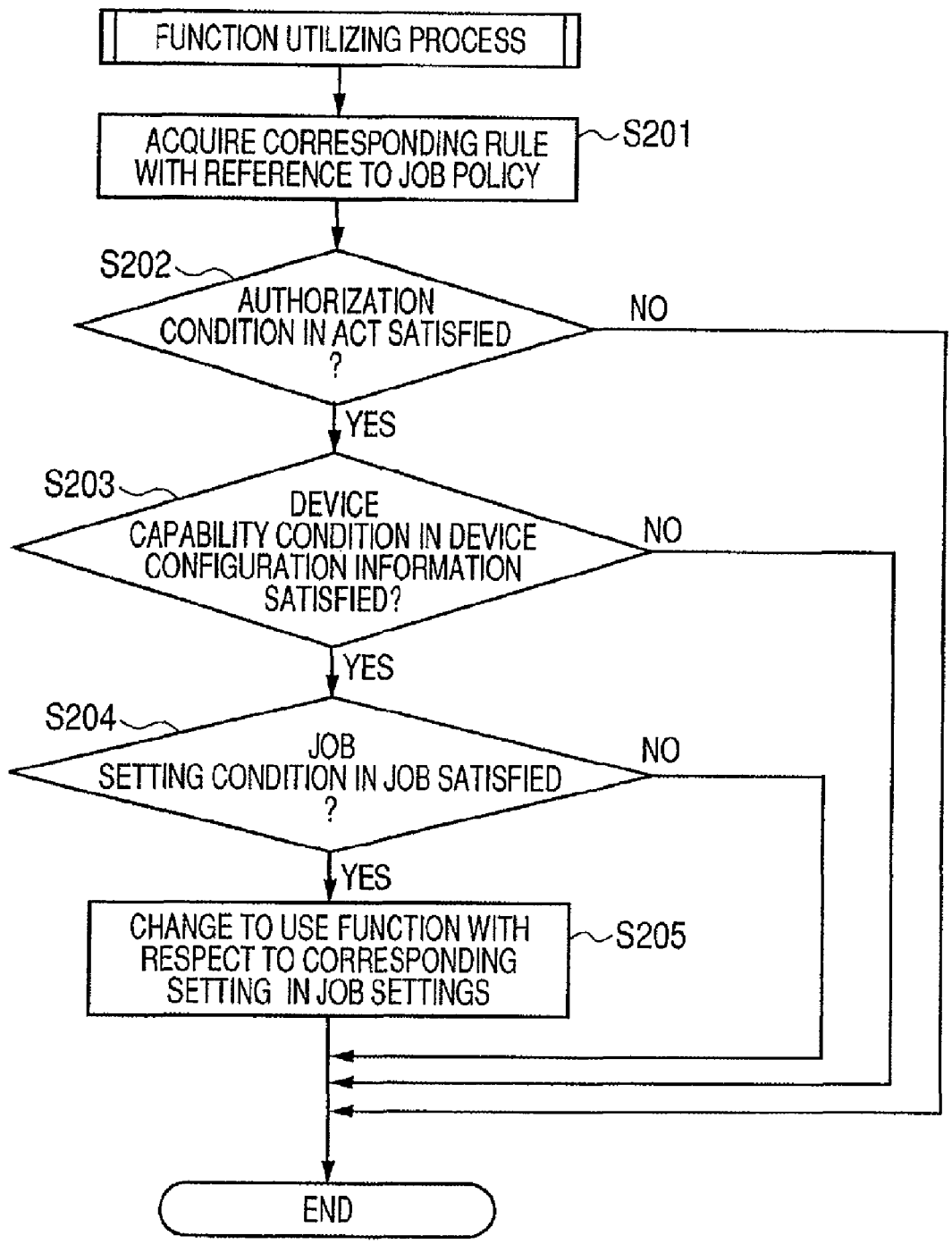
FIG. 9 is a flowchart on the basis of the control program relating to the function utilizing process performed when the function application mode is set as a "function utilization mode" in the first mode for embodying the present invention.

FIG. 9 is a flowchart on the basis of the control program relating to the function utilizing process when the application mode of function is set as a "function utilization mode". The control program is stored in the ROM or RAM of a client PC, the HD, etc. and executed by the CPU 1201 (or Drv 103), thereby realizing the process described in the control program.

In S201, the Drv 103 retrieves a rule corresponding to the attribute information about a function with reference to the job policy 108.

The process about a staple is described below with reference to FIG. 5.

In S202, the Drv 103 refers to the ACT acquired in S102, and determines whether or not it satisfies the condition of the job policy. If it satisfies the policy, control is passed to S203. Otherwise, the process is terminated. In the job policy shown in FIG. 5, when the authorization of a staple is permitted according to the access control information about the ACT, then the condition is satisfied, and control is passed to S203.

In S203, the Drv 103 refers to the device configuration information acquired in S103, and determines whether or not the condition of the job policy is satisfied. If the condition is satisfied, control is passed to S204. Otherwise, the present process is terminated. Practically, when a staple is included as a finishing function of the device configuration information, control is passed to S204.

In S204, the Drv 103 refers to the setting of a target job, and determines whether or not the condition of the job policy is satisfied. If it is satisfied, control is passed to S205. Otherwise, the present process is terminated. Practically, the set value of the print job set by the user refers to no staple setting in the finishing mode and two or more copies as the number of printed copies, control is passed to S205.

In S205, the job setting information is changed such that, as a process to be performed when all conditions defined by a job policy are satisfied, the Drv 103 can allow the user to utilize the function of a peripheral device in a job setting. Practically, the staple setting of the finishing mode as a set value of a print job is validated. In addition, when a job setting is changed, the information that a setting different from the user-specified print setting is permitted according to the access control information is displayed on the display of the CRT display 1210 etc., thereby notifying the user. Before changing the user-specified print setting, the information that permission is acquired according to the access control information, and a setting different from the user-specified print setting what will be convenient for the user can be displayed, and a setting change can be made after receiving permission of a user. At this time, the forcible setting change can be automatically performed by re-instructing the user to newly set a printing operation.

In the above-mentioned process, the process of changing a job setting such that the user can utilize the print setting of a print job is described with reference to an example of a staple function is mainly described. In the process above, a setting can be flexibly changed for, in addition to a common print setting such as a color setting, a Nup printing, etc., any function and a service provided by a peripheral device such as SEND, FAX, or BOX function, etc.

Figure 10:
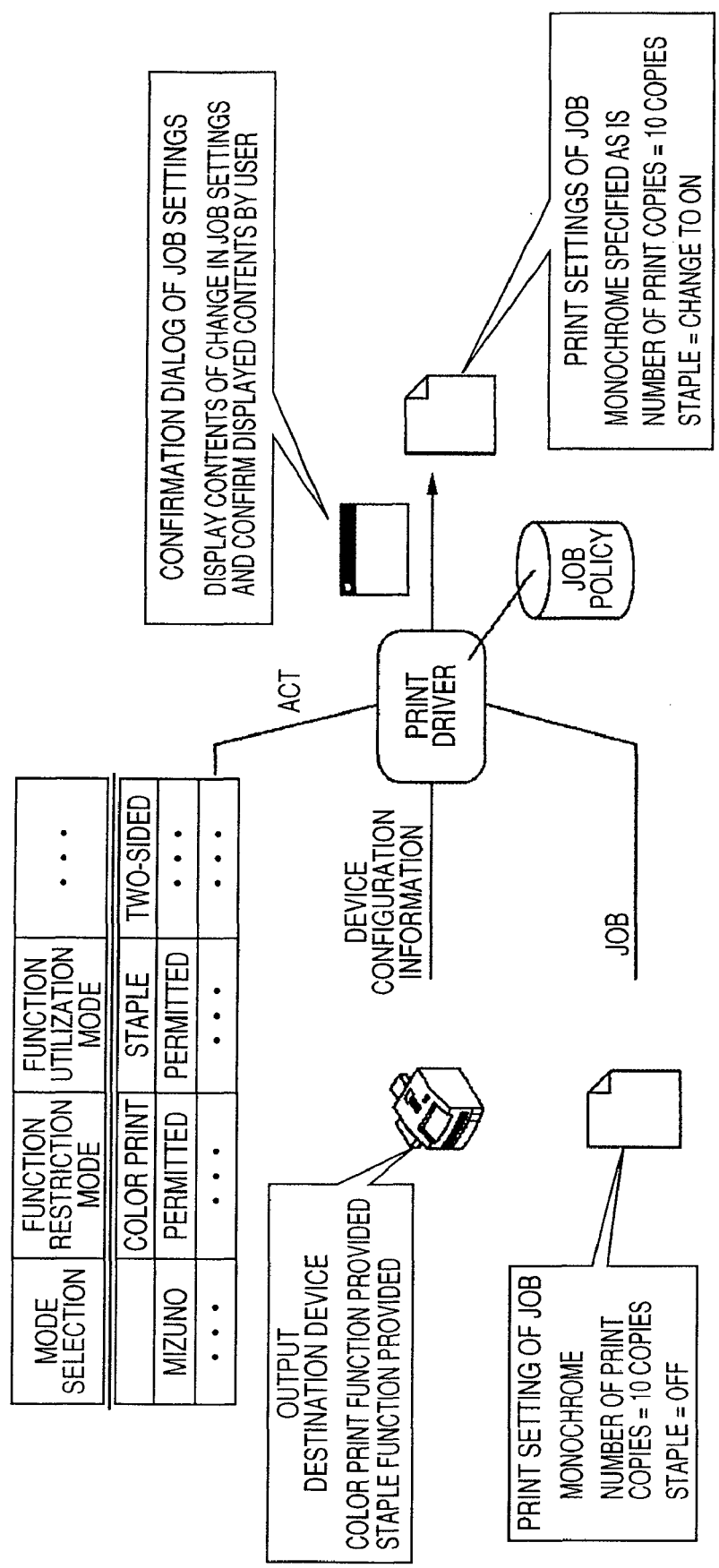
FIG. 10 illustrates an example illustrated as a schematic chart of a setting change of a job according to the present invention.

FIG. 10 is a schematic chart showing a change in job setting according to the present mode for embodying the present invention.

A printer driver acquires information about a job, information about the ACT of a user, and the configuration information about an output destination device.

As shown in FIG. 10, the job information includes monochrome, 10 copies as the number of printed copies, and staple OFF as settings. As the information about an ACT, color print and staple is permitted. As the configuration information about a device, color/staple functions are provided.

In this example, in the job policy, it is desired as the concept of a user or a manager, that the staple function is utilized. Therefore, a change is made to a set value for validating the staple as a set value of a job.

Figure 11:
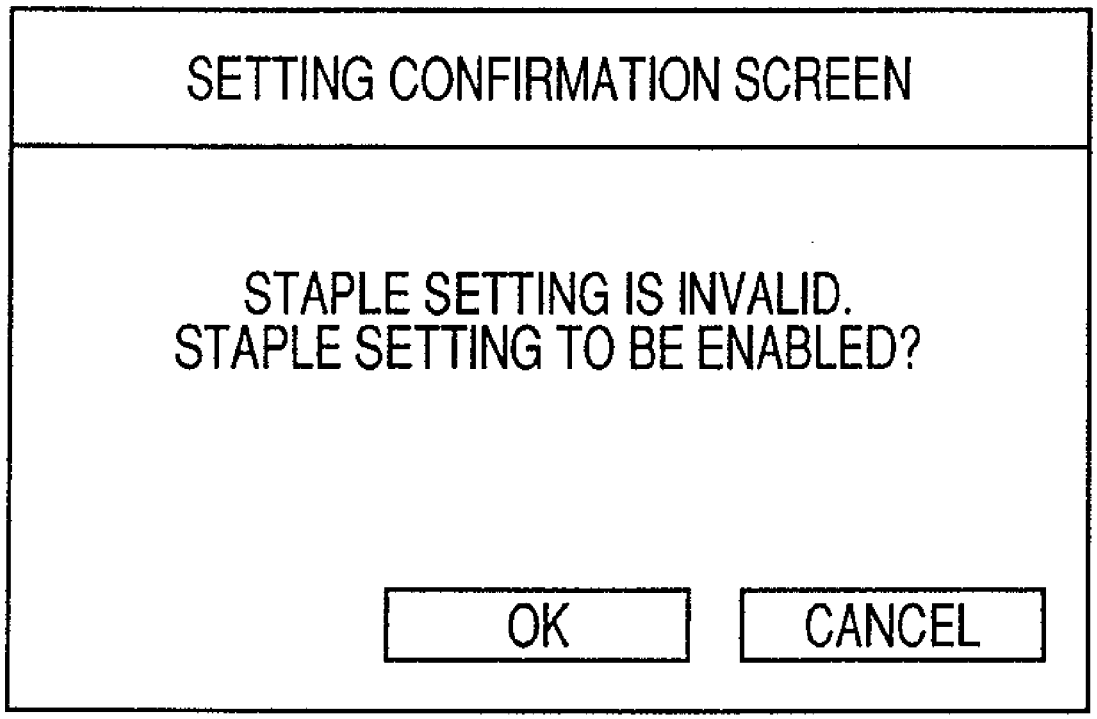
FIG. 11 illustrates the display for confirmation of the setting change to a user when the settings of a job can be changed according to the present invention.

At this time, the user is notified of a possible setting change, and confirms it. When the user approves it, the user finally sets, as a set value of a job, monochrome, 10 copies as the number of printed copies, staple ON, etc. Practically, the confirmation screen as to whether or not the staple setting shown in FIG. 11 is validated is displayed, the staple is validated if the user specifies OK, and the staple is nullified if cancel is specified, thereby executing the printing. At this time, the screen can be prepared to indicate the user that on a similar screen, the staple setting can be validated by the ACT.

Second Mode for Embodying the Present Invention

The processes in FIGS. 8 and 9 can also be realized as the process inside of the MFP 104 when a job is directly issued and processed using the operation panel of the MFP 104. At this time, the control program for realizing each process is stored in the ROM and RAM of the MFP 104, an HD, and executed by the CPU 1301, thereby realizing the process described in the control program.

As a difference in the process on a client PC, the subject of each process is the CPU 1301, and S103 and S110 are mainly different. In S103, the device configuration information held by the PC is acquired. In S110, the set value of the processed job is presented to a user through the operation unit 1311 etc., and then the PC processes the job.

APPLICATION EXAMPLE

In the modes 1 and 2 for embodying the present invention, the application mode relating to the function of a peripheral device can be set for each function as shown in FIG. 6. However, the application mode can be set for the entire system, each peripheral device, each peripheral device group, or each user. It is obvious that any combination of these or all of them can be realized.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2006-327028, filed Dec. 4, 2006, which is hereby incorporated by reference herein in its entirety.

What is claimed is:

1. An information processing apparatus which performs a process according to access control information for control of a use of a function of a peripheral device for each user, comprising:
a first acquisition unit configured to acquire setting information relating to the use of the function of the peripheral device specified by a user;
a second acquisition unit configured to acquire access control information corresponding to the user, wherein an application mode or a function restriction mode is set for each function of the peripheral device to be controlled in the access control information; a third acquisition unit configured to acquire configuration information about the peripheral device; and
a display unit configured to display a display screen informing that setting information acquired by the first acquisition unit based on the access control information acquired by the second acquisition unit can be changed, when the setting information acquired by the first acquisition unit is permitted by the access control information acquired by the second acquisition unit, when the setting information permitted by the access control information acquired by the second acquisition unit is not set by the setting information acquired by the first acquisition unit, when the setting information permitted by the access control information acquired by the second acquisition unit not set by the setting information acquired by the first acquisition unit can be processed by the peripheral device according to the configuration information acquired by the third acquisition unit, and when the application mode is set for a function corresponding to the setting information permitted by the access control information acquired by the second acquisition unit not set by the setting information acquired by the first acquisition unit,
wherein the display unit does not display the display screen when the function restriction mode is set for a function corresponding to the setting information permitted by the access control information acquired by the second acquisition unit not set by the setting information acquired by the first acquisition unit.

2. The information processing apparatus according to claim 1, wherein the information processing apparatus comprises a peripheral device.

3. An information processing apparatus which performs a process according to access control information for control of a use of a function of a peripheral device for each user, comprising:
a first acquisition unit configured to acquire setting information relating to the use of the function of the peripheral device specified by a user;
a second acquisition unit configured to acquire access control information corresponding to the user; and
a third acquisition unit configured to acquire configuration information about the peripheral device; and
a setting unit configured to automatically change setting information acquired by the first acquisition unit based on the access control information acquired by the second acquisition unit, when the setting information acquired by the first acquisition unit is permitted by the access control information acquired by the second acquisition unit, when the setting information permitted by the access control information acquired by the second acquisition unit is not set by the setting information acquired by the first acquisition unit, and when the setting information permitted by the access control information acquired by the second acquisition unit not set by the setting information acquired by the first acquisition unit can be processed by the peripheral device according to the configuration information acquired by the third acquisition unit.

4. The information processing apparatus according to claim 3, wherein an application mode is set for each function of the peripheral device to be controlled in the access control information, and wherein the setting unit changes the setting information acquired by the first acquisition unit according to the access control information acquired by the second acquisition unit when the application mode is a function utilization mode.

5. The information processing apparatus according to claim 3, wherein the setting unit changes a staple setting of the setting information acquired by the first acquisition unit to be valid when the user is permitted for valid or invalid staple setting in the access control information, and when the staple setting is invalid according to the setting information acquired by the first acquisition unit.

6. The information processing apparatus according to claim 3, wherein the setting unit changes a monochrome print setting for the setting information acquired by the first acquisition unit into a color print setting when the user is permitted for both color print and monochrome print in the access control information, and when the setting information acquired by the first acquisition unit is a monochrome print setting.

7. An information processing method carried out in an information processing apparatus which performs a process according to access control information for control of a use of a function of a peripheral device for each user, comprising:
a first acquiring step of acquiring setting information relating to the use of the function of the peripheral device specified by a user;
a second acquiring step of acquiring access control information corresponding to the user, wherein an application mode or a function restriction mode is set for each function of the peripheral device to be controlled in the access control information; a third acquiring step of acquiring configuration information about the peripheral device; and
a display control step of displaying a display screen informing that setting information acquired in the first acquiring step based on the access control information acquired in the second acquiring step can be changed, when the setting information acquired in the first acquiring step is permitted by the access control information acquired in the second acquiring step, when the setting information permitted by the access control information acquired in the second acquiring step is not set by the setting information acquired in the first acquiring step, when the setting information permitted by the access control information acquired in the second acquiring step not set by the setting information acquired in the first acquiring step can be processed by the peripheral device according to the configuration information acquired in the third acquiring step, and when the application mode is set for a function corresponding to the setting. information permitted by the access control information acquired by the second acquisition step not set by the setting information acquired by the first acquisition step, wherein the display step does not display the display screen when the function restriction mode is set for a function corresponding to the setting information permitted by the access control information acquired by the second acquisition step not set by the setting information acquired by the first acquisition step.

8. An information processing method carried out in an information processing apparatus which performs a process according to access control information for control of a use of a function of a peripheral device for each user, comprising:
   a first acquiring step of acquiring setting information relating to the use of the function of the peripheral device specified by a user;
   a second acquiring step of acquiring access control information corresponding to the user; a third acquiring step of acquiring configuration information about the peripheral device; and
   a setting step of automatically changing setting information acquired in the first acquiring step based on the access control information acquired in the second acquiring step, when the setting information acquired in the first acquiring step is permitted by the access control information acquired in the second acquiring step, when the setting information permitted by the access control information acquired in the second acquiring step is not set by the setting information acquired in the first acquiring step, and when the setting information permitted by the access control information acquired in the second acquiring step not set by the setting information acquired in the first acquiring step can be processed by the peripheral device according to the configuration information acquired in the third acquiring step.

9. A non-transitory computer-readable storage medium storing a control program for controlling a computer to execute an information processing method carried out in an information processing apparatus which performs a process according to access control information for control of a use of a function of a peripheral device for each user, the information processing method comprising:
   a first acquiring step of acquiring setting information relating to the use of the function of the peripheral device specified by a user;
   a second acquiring step of acquiring access control information corresponding to the user, wherein an application mode or a function restriction mode is set for each function of the peripheral device to be controlled in the access control information;
   a third acquiring step of acquiring configuration information about the peripheral device; and
   a display control step of displaying a display screen informing that setting information acquired in the first acquiring step based on the access control information acquired in the second acquiring step can be changed, when the setting information acquired in the first acquiring step is permitted by the access control information acquired in the second acquiring step, when the setting information permitted by the access control information acquired in the second acquiring step is not set by the setting information acquired in the first acquiring step, when the setting information permitted by the access control information acquired in the second acquiring step not set by the setting information acquired in the first acquiring step can be processed by the peripheral device according to the configuration information acquired in the third acquiring step, and when the application mode is set for a function corresponding to the setting information permitted by the access control information acquired by the second acquisition step not set by the setting information acquired by the first acquisition step, wherein the display step does not display the display screen when the function restriction mode is set for a function corresponding to the setting information permitted by the access control information acquired by the second acquisition step not set by the setting information acquired by the first acquisition step.

10. A non-transitory computer-readable storage medium storing a control program for controlling a computer to execute an information processing method carried out in an information processing apparatus which performs a process according to access control information for control of a use of a function of a peripheral device for each user, the information processing method comprising: a first acquiring step of acquiring setting information relating to the use of the function of the peripheral device specified by a user;
   a second acquiring step of acquiring access control information corresponding to the user;
   a third acquiring step of acquiring configuration information about the peripheral device; and
   a setting step of automatically changing setting information acquired in the first acquiring step based on the access control information acquired in the second acquiring step, when the setting information acquired in the first acquiring step is permitted by the access control information acquired in the second acquiring step, when the setting information permitted by the access control information acquired in the second acquiring step is not set by the setting information acquired in the first acquiring step, and when the setting information permitted by the access control information acquired in the second acquiring step not set by the setting information acquired in the first acquiring step can be processed by the peripheral device according to the configuration information acquired in the third acquiring step.

11. A print control system which includes a peripheral device and performs a printing process according to access control information for control of a use of a function of the peripheral device for each user, comprising:
   a first acquisition unit configured to acquire setting information relating to the use of the function of the peripheral device specified by a user;
   a second acquisition unit configured to acquire access control information corresponding to the user, wherein an application mode or a function restriction mode is set for each function of the peripheral device to be controlled in the access control information;
   a third acquisition unit configured to acquire configuration information about the peripheral device;
   a display unit configured to display a display screen informing that setting information acquired by the first acquisition unit based on the access control information acquired by the second acquisition unit can be changed, when the setting information acquired by the first acquisition unit is permitted by the access control information acquired by the second acquisition unit, when the setting information permitted by the access control information acquired by the second acquisition unit is not set by the setting information acquired by the first acquisition unit, when the setting information permitted by the access control information acquired by the second acquisition unit not set by the setting information acquired by the first acquisition unit can be processed by the peripheral device according to the configuration information acquired by the third acquisition unit, and when the application mode is set for a function corresponding to the setting information permitted by the access control information acquired by the second acquisition unit not set by the setting information acquired by the first acquisition unit, wherein the display unit does not display the display screen when the function restriction mode is set for a function corresponding to the setting information permitted by the access control information acquired by the second acquisition unit not set by the setting information acquired by the first acquisition unit; and a print unit configured to change the setting information acquired by the first acquisition unit and to execute printing when the user issues a setting change instruction on the basis of the display screen displayed by the display unit.

* * * * *